United States Patent
Hopwood et al.

(10) Patent No.: US 7,246,696 B2
(45) Date of Patent: Jul. 24, 2007

(54) APPARATUS FOR FORMING GROUPS OF BATTERY PLATES

(75) Inventors: Robert Timothy Hopwood, Highbridge (GB); Christopher Stephen Barge, Stapleton (GB); Tobin Lee Knighton, Albany, OR (US)

(73) Assignee: TBS Engineering Limited, Cheltenham (GB)

( * ) Notice: Subject to any disclaimer, the term of this patent is extended or adjusted under 35 U.S.C. 154(b) by 205 days.

(21) Appl. No.: 11/050,533

(22) Filed: Feb. 4, 2005

(65) Prior Publication Data

US 2005/0167245 A1   Aug. 4, 2005

Related U.S. Application Data

(60) Provisional application No. 60/541,237, filed on Feb. 4, 2004.

(51) Int. Cl.
*B65G 47/26* (2006.01)
*H01M 10/14* (2006.01)

(52) U.S. Cl. ............... 198/431; 198/448; 198/601; 29/730

(58) Field of Classification Search ............... 198/431, 198/448, 601; 29/730
See application file for complete search history.

(56) References Cited

U.S. PATENT DOCUMENTS

| | | | | |
|---|---|---|---|---|
| 2,897,950 | A * | 8/1959 | Leland | 198/418.3 |
| 3,799,321 | A * | 3/1974 | Agui | 198/418.3 |
| 4,314,403 | A | 2/1982 | Sanekata | |
| 4,583,286 | A * | 4/1986 | Schaumburg et al. | 29/730 |
| 4,917,230 | A * | 4/1990 | Barchman | 198/434 |
| 5,046,917 | A * | 9/1991 | Frey | 414/789.5 |
| 5,344,466 | A * | 9/1994 | Rose et al. | 29/623.1 |
| 2004/0191050 | A1* | 9/2004 | Lafontaine et al. | 414/791.6 |

FOREIGN PATENT DOCUMENTS

GB    2 104 280    3/1983

* cited by examiner

*Primary Examiner*—Mark A. Deuble
(74) *Attorney, Agent, or Firm*—Young & Thompson

(57) ABSTRACT

An apparatus for forming groups of battery plates includes at least first and second plate supply lines each including a separation station and a downstream plate supply. The apparatus further includes a first common plate feed line for the envelopers and a second common plate feed line for the downstream plate supplys.

6 Claims, 4 Drawing Sheets

APPARATUS FOR FORMING GROUPS OF BATTERY PLATES

CROSS REFERENCE TO RELATED APPLICATIONS

A claim to priority is made to U.S. Provisional Application No. 60/541,237, filed Feb. 4, 2004.

FIELD OF THE INVENTION

This invention relates to apparatus for forming groups of battery plates.

BACKGROUND OF THE INVENTION

In the manufacture of lead acid, and similar, batteries it is known to have to assemble groups or stacks of battery plates for insertion in the compartments of the battery box. Frequently alternate plates are enveloped in porous separator material, although at times it is necessary that adjacent plates are both enveloped or there may be an unenveloped pair in the group. Apparatus is therefore provided for assembling appropriate groups and typically there is an upstream plate feeder, which feeds plates onto a central conveyor upstream of an enveloper, which envelopes the plates coming down that section of the conveyor. One or more further plate feeders are provided downstream of the enveloper so that desired sequences of enveloped and unenveloped plates travel down the conveyor. At the end of the main conveyor the plates pass into a pocketed conveyor, which is timed to receive the desired group or stack of plates within its respective pocket. The stacking conveyor has a buffer zone which passes under a group handling device, which removes the assembled groups out of the stacker and places them onto a feed for a cast-on strap machine, where the groups have their terminals cast-on, prior to insertion into the battery boxes.

This arrangement used to work perfectly well, but in more recent years the speed of the cast-on machines and the other parts of the line downstream from the group forming apparatus, has increased significantly and thus more rapid supply of formed groups has been required.

At first sight, a person not skilled in the art might have thought the solution was simply to buy two stacking lines to feed the cast-on machine, but this simply has the effect of doubling up the labour, quite apart from increasing the capital cost and the approach is not economically acceptable to the industry. Attempts have therefore been made to increase the speed of the existing apparatus, in particular by doubling up the plate feeds both upstream and downstream of the enveloper. Some high speeds, in terms of plates per minute, have been claimed for such arrangements, but in practice there are significant limitations when one comes to running the apparatus on a production basis. This is because at speeds above about 150 plates per minute the plates and enveloping material are travelling so fast that aerodynamic affects become progressively more significant making it much harder, if not impossible, to control the correct sequencing of the apparatus. Further at the point of transfer the plate is expected to come to rest before it is picked up by the fingers on the main conveyor. At these elevated speeds the plates have often not settled. The resultant mis-timings and mis-alignments will frequently cause jamming of the machine and it will be appreciated that, at these very high speeds of operation, any blockage on the main conveyor, quickly creates a significant pile up of plates, even in the short time that it may take for such a jam to be detected.

SUMMARY OF THE INVENTION

According to the present invention there is provided apparatus for forming groups of battering plates including at least first and second plates supply lines each including a separator station and a downstream plate supply; the apparatus further including a first common plate feed line for the envelopers and a second common plate feed line for the downstream plate supplys.

The Applicants have appreciated that, by having a pair of parallel acting envelopers and downstream plate supplys they can achieve very rapid group forming, without either line needing to run at speeds which induce aerodynamic instability, but by providing common plate feed lines for the envelopers and the downstream plate supplies they are able to maintain the same level of manning as conventional apparatus. As, over the life of the apparatus, the labour costs far exceed any capital costs, this arrangement, surprisingly, overcomes the problems of the previously suggested solutions.

In a preferred embodiment the separator station will be a plate enveloper but alternatively it could be a leaf separator supply device or an advanced glass mat supply device or indeed any suitable means for providing separation.

In a preferred embodiment the apparatus further includes plate handling means for picking groups alternately from respective stackers.

Conveniently the stackers include a buffer zone from which the groups can be picked.

It is particularly preferred that each supply line runs at a rate of between 80 and 150 plates per minute and it is believed that a rate of 130 plates per minute provides a particularly good compromise between speed and stability. It will be understood that in those circumstances the handling apparatus will effectively receive 260 plates per minute, which is substantially over even the highest theoretical rates of supply provided by other sources.

Although the invention has been defined above it is to be understood it includes any inventive combination of the features set out above or in the following description.

BRIEF DESCRIPTION OF THE DRAWINGS

The invention may be performed in various ways and specific examples will now be described in relation to the accompanying drawings, in which.

DETAILED DESCRIPTION OF THE DESCRIBED EMBODIMENTS

Figure 1:
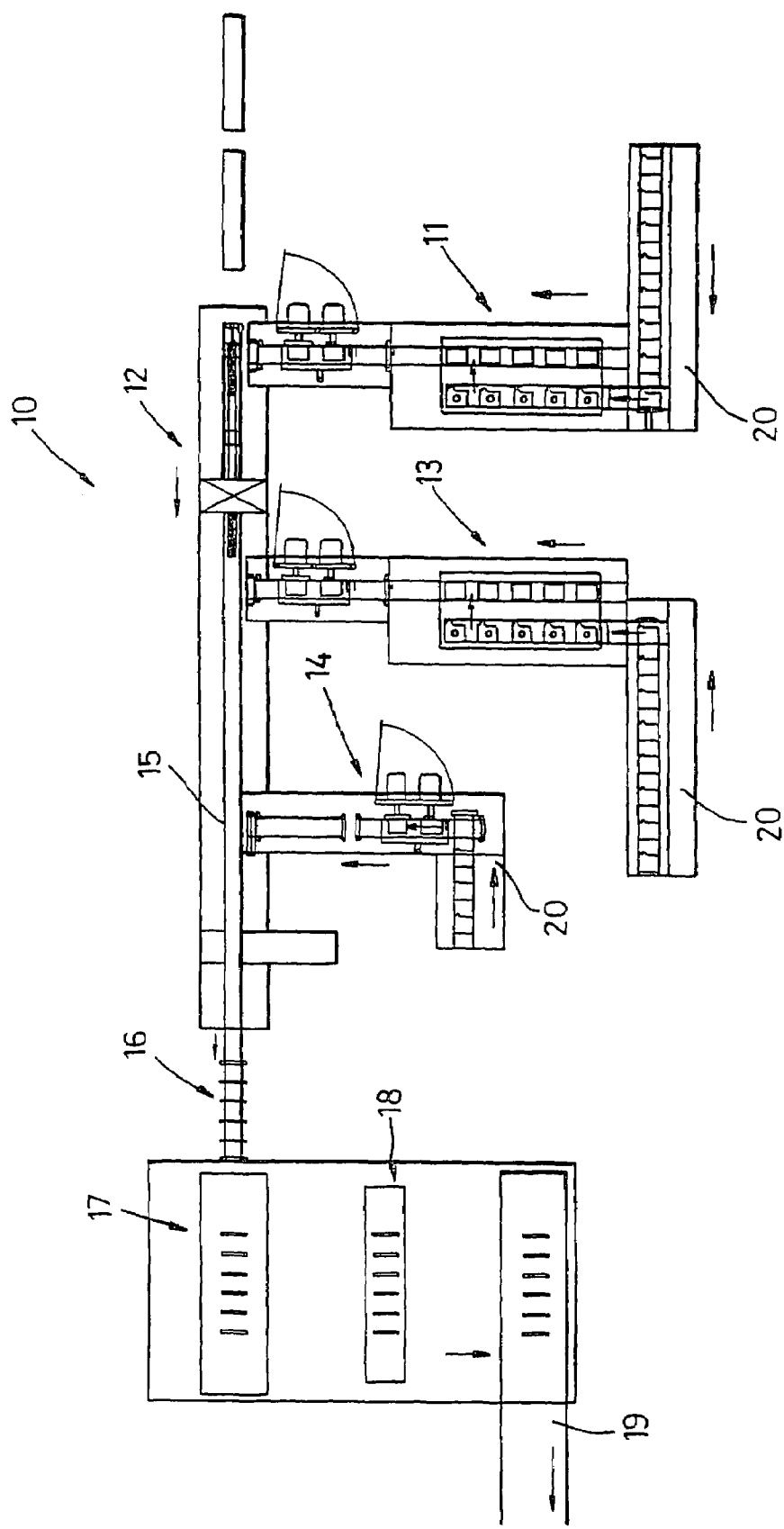
FIG. 1 is a plan view of a traditional apparatus for forming groups.

In FIG. 1 an apparatus for forming groups is generally indicated at 10 and includes an upstream plate supply 11, an enveloper 12, a first downstream plate supply 13 and an auxiliary plate supply 14. It will be seen that all of the plate supplies deliver plates onto a main conveyor 15, which in turn feeds a stacker 16, that delivers groups of plates into a buffer zone 17, where handling apparatus, schematically illustrated at 18, laterally transfers the groups onto a feed 19 for a cast-on strap machine not shown.

It will be noted that each of these supplys 11, 13 and 14 has a feed conveyor 20. Currently a respective worker is required to maintain a supply of plates onto the feed conveyor 20. As the use of the supply 14 is more occasional, the worker on the feed conveyor 20 of supply 13 can also maintain the feed supply at 14.

In use envelopes supplied onto the main conveyor 15 by the supply 11 pass through the enveloper 12, where they are enveloped. For many batteries alternate enveloped and unenveloped plates are required and so the supply 13 inserts an unenveloped plate between each envelope plate. If, as is required in some configurations, from time to time two unenveloped plates are required between a pair of envelope plates, then the supply 14 delivers an additional plate On the other hand if a pair of enveloped plates are required immediately adjacent to each other, then the supply 13 is momentarily stopped.

This arrangement works very adequately up to 150 plates per minute.

Figure 2:
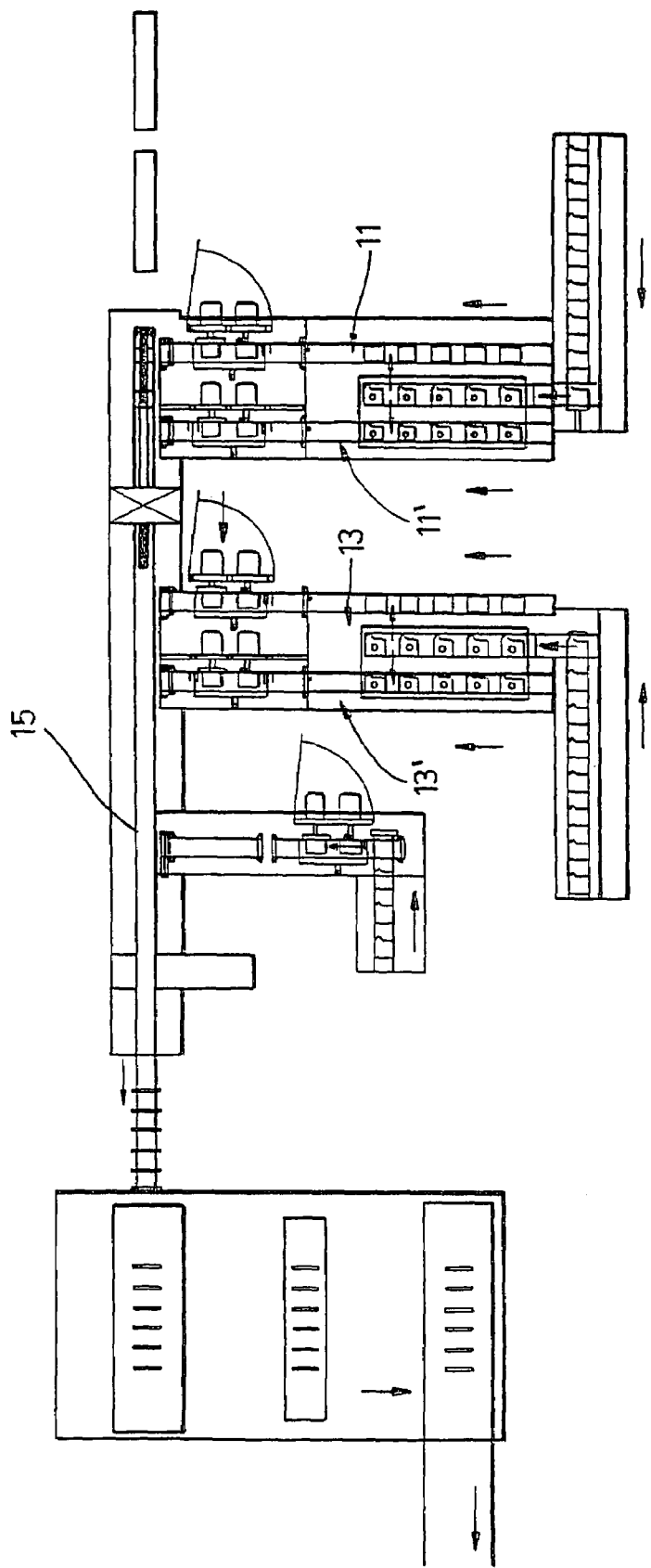
FIG. 2 is a plan view of a prior art adaptation of FIG. 1.

However, as has been indicated above, a rate of 150 plates per minute is insufficient to keep up with the now achievable greater battery production. An attempt at a solution to this problem is shown in FIG. 2, where each feed conveyor 20 feeds dual parallel supplies 11, 11' and 13, 13' so as to be able to increase the rate at which plates are dealt onto the main conveyor 15. It is certainly possible to place plates onto the main conveyor 15 at a rate of 180 plates per minute and the Applicants have seen claims that 220 plates per minute are achievable, although they have not seen that occur in practice. However, even at 180 plates per minute the aforementioned aerodynamic and settling effects become significant and it is extremely difficult to control the machine over a production cycle.

Figure 3:
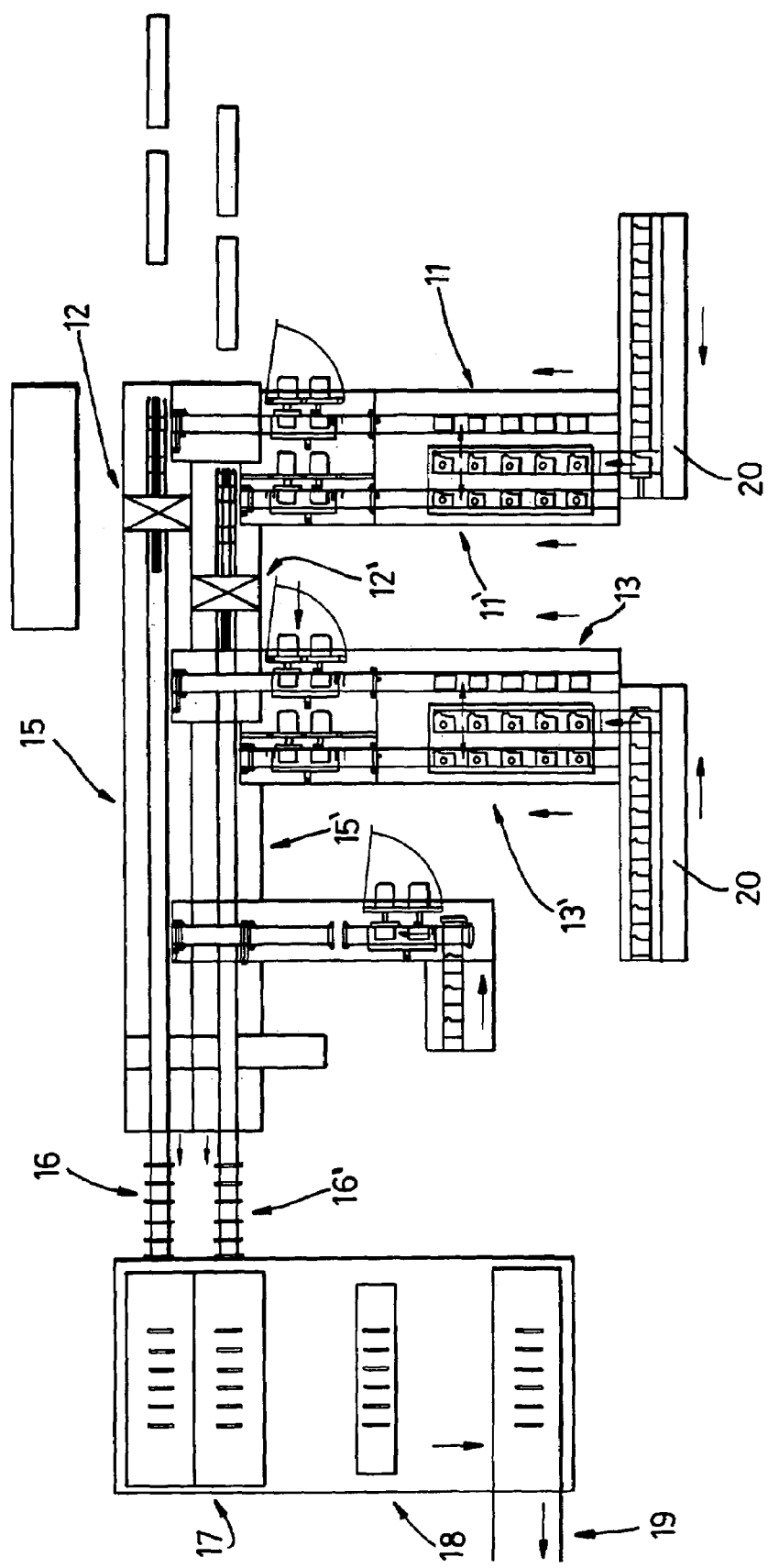
FIG. 3 is a plan view of the Applicants specific apparatus.
Figure 4:
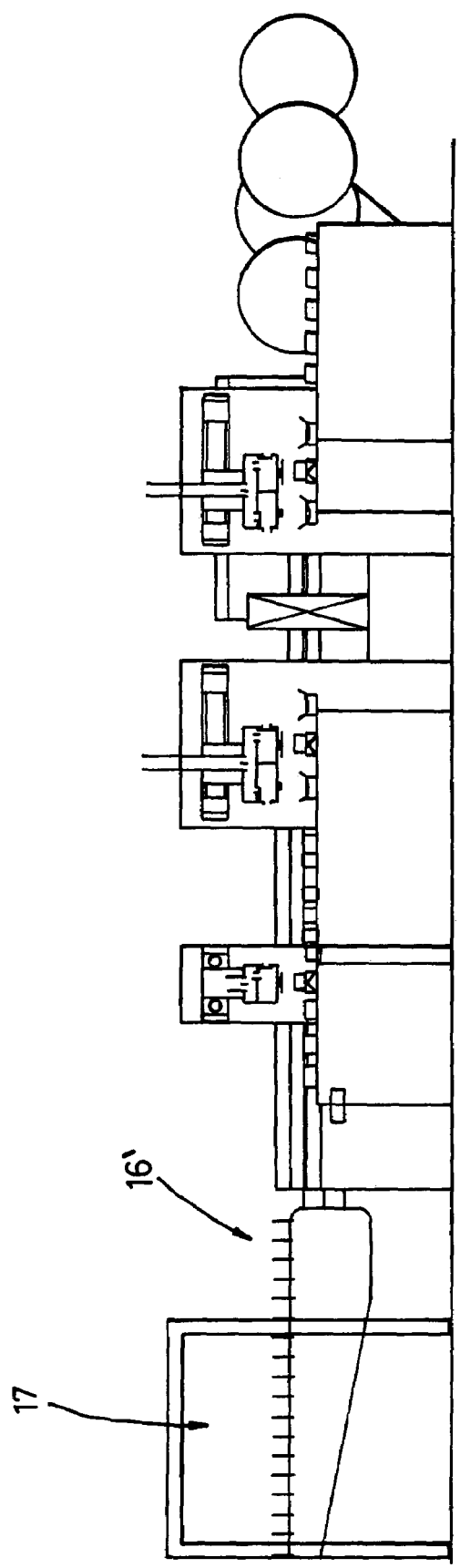
FIG. 4 is a side view of the apparatus of FIG. 3.

Turning to FIGS. 3 and 4 the Applicants use dual supplys 11, 11' and 13, 13', but arrange them to feed, respectively, main conveyors 15, 15' and envelopers 12, 12' so that each main conveyor 15, 15' only needs to travel at a speed which will deliver up to 150 plates per minute and preferably no more than 130 plates per minute. Conveyors 15, 15' feed stackers 16, 16' which then enter the buffer 17. Existing handling apparatus 18 can be readily modified to operate at a sufficient speed to pick groups formed by stackers 16 and 16' alternatively and in this way can supply up to 260 plates per minute to the cast-on strap feed 19.

Although there is some additional capital cost in the provision of the second enveloper, main conveyor and stacker, the configuration achieves, previously unachievable feed rates, without any increase in the workforce. In addition each main conveyor 15, 15' is operating within a speed range at which aerodynamic effects are not present or significant and the Applicants configuration has a smaller footprint than could be achieved if two separate supply lines were used.

If higher speeds still are required further supplys and conveyors can be added.

What is claimed is:

1. Apparatus for forming groups of battery plates, comprising two main conveyors (15, 15'), each said main conveyor (15, 15') having a station (12, 12') for the supply of battery plate separators, means (11, 11', 20) common to both said two main conveyors (15, 15') for supplying both of said two main conveyors (15, 15') with battery plates at locations upstream of said stations (12, 12') with respect to a direction of travel of said main conveyors (15, 15'), and means (20, 13, 13') common to both said two main conveyors (15, 15') for supplying both of said two main conveyors (15, 15') with battery plates at locations downstream of said stations (12, 12') with respect to said direction of travel of said main conveyors (15, 15').

2. Apparatus as claimed in claim 1, further comprising handling apparatus for combining and handling battery plates from both said main conveyors (15, 15').

3. Apparatus as claimed in claim 1, each said main conveyor (15, 15') feeding a respective one of two stackers (16, 16'), and a plate handling device for picking groups of plates alternately from said stackers (16, 16').

4. Apparatus for forming groups of battery plates, comprising two feed conveyors (20), each said feed conveyor (20) feeding two battery plate supplies (11, 11'; 13, 13'), two main conveyors (15, 15'), each said main conveyor (15, 15') having a station (12, 12') for the supply of battery plate separators, each of said two battery plate supplies (11, 11') fed by one of said two feed conveyors (20) supplying a respective one of said two main conveyors (15, 15') at locations upstream of said stations (12, 12') with respect to a direction of travel of said main conveyors (15, 15'), each of said two battery plate supplies (13, 13') fed by the other of said two feed conveyors (20) supplying a respective one of said two main conveyors (15, 15') at locations downstream of said stations (12, 12') with respect to said direction of travel of said main conveyors (15, 15').

5. Apparatus as claimed in claim 4, further comprising handling apparatus for combining and handling battery plates from both said main conveyors (15, 15').

6. Apparatus as claimed in claim 4, each said main conveyor (15, 15') feeding a respective one of two stackers (16, 16'), and a plate handling device for picking groups of plates alternately from said stackers (16, 16').

* * * * *